Patented July 6, 1937

2,085,859

UNITED STATES PATENT OFFICE 2,085,859

MANUFACTURE OF RUBBER ARTICLES

Walter Kay, Bury, England, assignor to Kaysam Corporation of America, Dover, Del., a corporation of Delaware No Drawing. Application October 20, 1933, Serial No. 694,517. In Great Britain October 28, 1932

7 Claims. (Cl. 18—58)

This invention relates to the manufacture of articles from rubber or rubberlike compositions. The invention is concerned with articles having parts of different physical characteristics, such as shoes which should be of different strength or hardness. The primary object of the invention is to produce such articles from sensitive mixtures capable of setting or gelling as a whole without synaeresis. Shoes and boots require integral heels which should be harder and tougher than the uppers, and hitherto it has not been possible to make them from such sensitive mixtures.

In proceeding according to the present invention, use is preferably made of mixtures such as are disclosed in my co-pending application, Serial No. 640,650, filed 1st November 1932, now Patent No. 2,014,253, dated September 10, 1935: That is to say; mixtures which are capable of setting irreversibly. Such mixtures may be poured into molds and caused to set or gel therein to a microporous body which on being dried under conditions permitting the escape of water contained in it will become a non-porous body having the shape of the mold but being in general of smaller dimensions owing to the shrinkage that occurs during drying.

In the process forming the invention, mixtures of different compositions are formed and one or more parts of a mold are then filled with one such mixture. Then one or more other parts of the mold are filled with another such mixture, and the mixtures are caused to set in contact with one another to form the composite article. An important feature of the invention consists in pouring the second mixture into the mold before surface solidification of the first occurs, because it is found that once a skin has formed on the surface the two mixtures will not unite.

It is important to prevent any displacement of the first mixture by the second, and accordingly the second mixture may be poured simultaneously through two or more charging openings into the mold. However, it is preferred to bring the first mixture nearly to the point of setting or gelling before being poured into the mold. It is found that if this is done and the second mixture is poured in before the first has set or gelled so that no surface skin is formed, superficial mingling of the mixtures takes place and the two mixtures set as a whole without any displacement of the first.

In order that the invention may be clearly understood, the manufacture of a rubber boot will now be described by way of example.

First of all a mix suitable for the production of the sole is made up as follows:—

| | | |
|---|---|---|
| The concentrated latex sold under the registered trade-mark "Revertex" | gms | 130 |
| Sulphur | do | 1.75 |
| Accelerator | do | 0.75 |
| Zinc oxide | do | 10.25 |
| Titanium oxide | do | 2.75 |
| Yellow ochre | do | 2.5 |
| Precipitated whiting | do | 100 |
| Water | cc | 90 |

Next, to each 100 cc. of the liquid mix thus formed 7 cc. of a setting solution are added, the setting solution having the following composition:—

| | | |
|---|---|---|
| Ammonium nitrate | gms | 1,900 |
| Water | cc | 1,500 |
| 0.880 ammonia | cc | 77 |

This amount of setting solution is sufficient to cause the mixture to thicken when stirred without the application of heat at all. When the resultant mixture has thickened almost to the point of gelling it is poured into the sole part of the mold, which latter of course contains a core. Next, a further mixture is poured into the remaining part of the mold, this mixture being formed from an initial mix made up as follows:—

| | | |
|---|---|---|
| "Revertex" | gms | 130 |
| Sulphur | do | 1.75 |
| Accelerator | do | 0.75 |
| Zinc oxide | do | 5 |
| Pigment | do | 5 |
| Chromium oxide | do | 5 |
| Precipitated whiting | do | 25 |
| Water | cc | 50 |

The mixture is formed by adding to each 100 cc. of this initial mix 5 cc. of the same setting solution diluted with 7 cc. of water. Superficial mingling of the mixes takes place in the mold, which is then heated externally with the result that the whole of the contents sets or gels into a single micro-porous product. This article, when set, can at once be removed from the mold, washed, and transferred to a last or former on which it is dried.

The invention is not limited to the use of only two different mixtures in the formation of any given product. Moreover, the different mixtures used may differ in respect of various physical characteristics. As will be appreciated from the examples given above, in the manufacture of boots or shoes it is desirable to use relatively heavily loaded mixtures for the heels and soles, and relatively lightly loaded mixtures for the uppers.

Again, the different mixtures may contain different quantities of vulcanizing agents, such as sulphur, so that when the resultant product is subjected to vulcanization, one part of it will become harder than another. Yet again, the invention allows of differently coloured mixtures being used so that, apart from any paint which may be applied to the finished product, one part of it will have a different basic colour from another.

The micro-porous products which are removed from the molds are washed and preferably dried under such conditions that any water contained in them can escape and then subjected to vulcanization. These and other subsequent steps, however, constitute no part of the present invention.

I claim:

1. The process of casting in a mold a composite rubber article, at least two parts of which have different physical characteristics, comprising the following steps, forming various rubber mixtures, each of which is capable of setting or gelling irreversibly as a whole to form a unit differing in physical characteristics from the units formed by the other mixtures, filling at least one part of the mold with one such mixture, filling at least one other adjacent part of the mold with another such mixture, the two mixtures being brought into surface contact before any surface solidification has taken place, and permitting said mixtures to set irreversibly in such contact to form the composite article.

2. The process of casting in a mold a composite rubber article, at least two parts of which have different physical characteristics, comprising the following steps, forming various rubber mixtures, each of which is capable of setting or gelling irreversibly as a whole to form a unit differing in physical characteristics from the units formed by the other mixtures, bringing said mixtures nearly to the setting or gelling condition, filling at least one part of the mold with one such mixture, filling at least one other adjacent part of the mold with another such mixture, the two mixtures being brought into surface contact before any surface solidification has taken place, and permitting said mixtures to set irreversibly in such contact to form the composite article.

3. The process of casting in a mold a composite rubber article, at least two parts of which have different physical characteristics, comprising the following steps, forming various rubber mixtures, each of which is capable of setting or gelling irreversibly as a whole to form a unit differing in physical characteristics from the units formed by the other mixtures, stirring said mixtures to cause them to thicken, filling at least one part of the mold with one such mixture, filling at least one other adjacent part of the mold with another such mixture, the two mixtures being brought into surface contact before any surface solidification has taken place, and permitting said mixtures to set irreversibly in such contact to form the composite article.

4. The process of casting in a mold a composite rubber article, at least two parts of which have different physical characteristics, comprising the following steps, forming various rubber mixtures, each of which is capable of setting or gelling irreversibly as a whole to form a unit differing in physical characteristics from the units formed by the other mixtures, filling at least one part of the mold with one such mixture, filling at least one other adjacent part of the mold with another such mixture, the two mixtures being brought into surface contact before any surface solidification has taken place, and heating said mold to cause said mixtures to set irreversibly in such contact to form the composite article.

5. The process of casting in a mold a composite rubber article, at least two parts of which have different physical characteristics, comprising the steps of forming various rubber mixtures, each of which is capable of setting or gelling irreversibly as a whole to form a unit differing in physical characteristics from the units formed by the other mixtures, filling different parts of said mold with said mixtures, permitting superficial mingling of said mixtures to take place while each mixture remains undisplaced from the part of the mold filled thereby, and causing the mixtures to set in such superficial contact with each other to form the composite article.

6. The process of casting in a mold a composite rubber article, at least two parts of which have different physical characteristics, comprising the steps of forming various rubber mixtures, each of which is capable of setting or gelling irreversibly as a whole to form a unit differing in physical characteristics from the units formed by the other mixtures, filling adjacent parts of the mold with said mixtures at time intervals such that any given mixture enters the mold before any adjacent mixture has started to set, each mixture being in surface contact with the mixtures adjacent thereto, and permitting the mixtures to set in such contact to form the composite article.

7. The process of casting in a mold a composite rubber article, at least two parts of which have different physical characteristics, comprising the steps of forming various rubber mixtures, each of which is capable of setting or gelling irreversibly as a whole to form a unit differing in physical characteristics from the units formed by the other mixtures, filling adjacent parts of the mold with said mixtures at time intervals such that any given mixture enters the mold before any adjacent mixture has started to set, each mixture being in surface contact with the mixtures adjacent thereto, and heating the mold to cause the mixtures to set in such contact to form the composite article.

WALTER KAY.